US012085895B2

(12) United States Patent
Tanaka

(10) Patent No.: US 12,085,895 B2
(45) Date of Patent: Sep. 10, 2024

(54) NOTIFICATION CONTROL DEVICE, WATCH, NOTIFICATION CONTROL METHOD, AND NON-TRANSITORY RECORDING MEDIUM

(71) Applicant: CASIO COMPUTER CO., LTD., Tokyo (JP)

(72) Inventor: Hitoshi Tanaka, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 454 days.

(21) Appl. No.: 17/467,677

(22) Filed: Sep. 7, 2021

(65) Prior Publication Data

US 2022/0075320 A1 Mar. 10, 2022

(30) Foreign Application Priority Data

Sep. 9, 2020 (JP) ................................ 2020-151193

(51) Int. Cl.
*G04B 19/04* (2006.01)
*G04C 3/14* (2006.01)
*G04C 17/00* (2006.01)
*G04G 19/12* (2006.01)

(52) U.S. Cl.
CPC ........... *G04B 19/046* (2013.01); *G04C 3/146* (2013.01); *G04C 17/0066* (2013.01); *G04G 19/12* (2013.01)

(58) Field of Classification Search
CPC .. G04B 19/046; G04C 3/146; G04C 17/0066; G04G 19/12
USPC ........................................................... 368/44
See application file for complete search history.

(56) References Cited

U.S. PATENT DOCUMENTS 6,661,743 B1 * 12/2003 Mafune .................. G04F 10/00 368/242
2017/0023912 A1 * 1/2017 Lecher .................. G04B 19/16
2017/0269792 A1 * 9/2017 Xu .......................... G06F 3/048
(Continued)

FOREIGN PATENT DOCUMENTS

JP 2015064317 A * 4/2015
JP 2016-012217 A 1/2016
JP 2019200572 A * 11/2019

OTHER PUBLICATIONS

Notification of Reasons for Rejection dated Dec. 7, 2021 received in Japanese Patent Application No. JP 2020-151193 together with an English language translation.

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

A notification control device acquires a plan of a subject, and causes a notifier to notify current day plan content information in a first notification mode and future plan content information in a second notification mode that differs from the first notification mode. The current day plan content information is information about the acquired plan of the subject for current day or is information about the acquired plan of the subject for a certain period including the current day. The future plan content information is information about the acquired plan of the subject for the future of the certain period or is information about the acquired plan of the subject for a certain future period not including the current day.

7 Claims, 11 Drawing Sheets

(56) References Cited

U.S. PATENT DOCUMENTS

2018/0181078 A1* 6/2018 Imamura .............. G04G 9/0064
2019/0068771 A1* 2/2019 Cutler .................... G04G 21/04

* cited by examiner

FIG. 4

| NO. | SCHEDULE SETTING DATE AND THE LIKE | REPEAT SETTING | NOTIFICATION CONTENT (SCHEDULE CONTENT) |
|---|---|---|---|
| 1 | AUG. 24, 2020 | NO REPEAT | TEST |
| 2 | MAY 23 | EVERY YEAR | BIRTHDAY |
| 3 | MAY 23, 2020 TO MAY 25, 2020 | NO REPEAT | TRIP |
| 4 | JULY 23 TO AUG. 31 | EVERY YEAR | VACATION |
| 5 | THURSDAY | EVERY WEEK | LESSON |

FIG. 5

| NOTIFICATION PATTERN | NOTIFICATION MODE |
|---|---|
| PATTERN 1 | SCROLL DISPLAY NOTIFICATION CONTENT AT NORMAL SPEED |
| PATTERN 2 | AFTER PATTERN 1, SCROLL DISPLAY EVERY ONE SECOND |

NOTIFICATION CONTROL DEVICE, WATCH, NOTIFICATION CONTROL METHOD, AND NON-TRANSITORY RECORDING MEDIUM

CROSS-REFERENCE TO RELATED APPLICATION

This application claims the benefit of Japanese Patent Application No. 2020-151193, filed on Sep. 9, 2020, the entire disclosure of which is incorporated by reference herein.

FIELD

This application relates generally to a notification control device, a watch, a notification control method, and a non-transitory recording medium.

BACKGROUND

Watches with schedule management functions are known in the related art. For example, Unexamined Japanese Patent Application Publication No. 2015-064317 describes an electronic watch capable of effectively notifying a user of a trash collection day in order to prevent the user from forgetting to put out the trash on a specific collection day.

SUMMARY

A notification control device of the present disclosure includes at least one processor configured to acquire a plan of a subject, and cause a notifier to notify current day plan content information in a first notification mode and future plan content information in a second notification mode that differs from the first notification mode, (i) the current day plan content information being information about the acquired plan of the subject for a current day or being information about the acquired plan of the subject for a certain period including the current day, (ii) the future plan content information being information about the acquired plan of the subject for a future of the current day or being information about the acquired plan of the subject for a certain future period not including the current day.

BRIEF DESCRIPTION OF THE DRAWINGS

A more complete understanding of this application can be obtained when the following detailed description is considered in conjunction with the following drawings, in which:

FIG. 4 is an explanatory drawing illustrating examples of schedule information;

FIG. 5 is an explanatory drawing illustrating examples of notification patterns;

DETAILED DESCRIPTION

Figure 1:
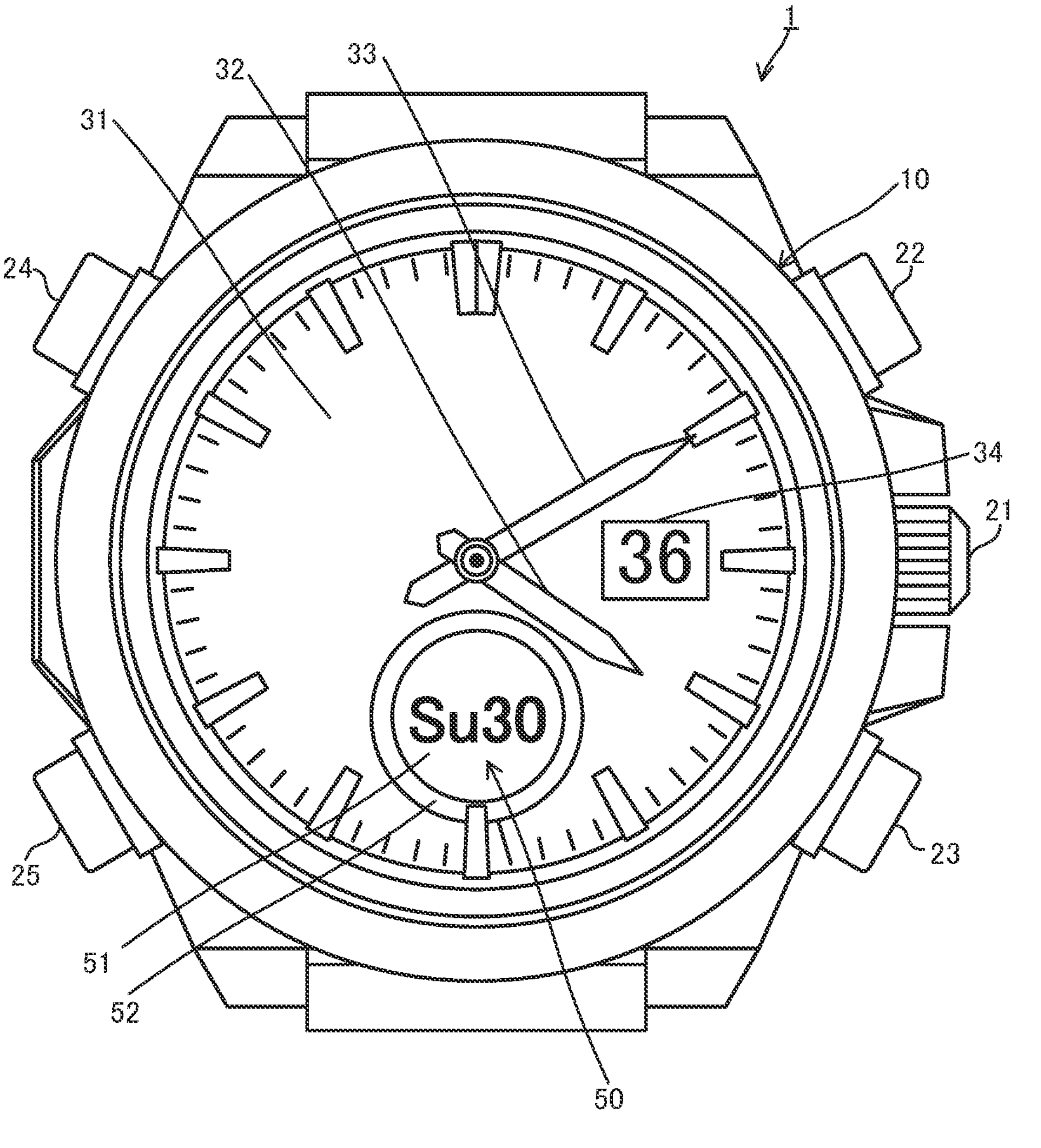
FIG. 1 is an appearance drawing of a watch according to an embodiment of the present disclosure.

Hereinafter, embodiments of the present disclosure are described in detail while referencing the drawings. Note that, in the drawings, identical or corresponding components are denoted with the same reference numerals.

FIG. 1 is an appearance drawing of a watch 1 (notification control device) according to an embodiment of the present disclosure. The watch 1 includes a case 10 in which a top surface is formed from windshield glass, and a winding crown 21 and button switches 22 to 25 disposed on a side surface of the case 10. A dial 31 and various hands (an hour hand 32 and a minute hand 33) are provided in the case 10. A subject (for example, a user) can view the dial 31 and the various hands through the windshield glass. Signs and scales that express the time are provided on the dial 31. The various hands (the hour hand 32 and the minute hand 33) rotate above the dial 31 to display the current time. Note that, in this embodiment, an example is given in which a second hand is not provided, and a number of seconds corresponding to the current time is displayed in a number of seconds display area 34 such as illustrated in FIG. 1. However, a configuration is possible in which a second hand is provided. Moreover, a configuration is possible in which the present disclosure is applied to a watch that does not include the winding crown 21.

A notifier 50 is provided in the six o'clock direction of the dial 31. The notifier 50 includes a notification area 51 and a notification frame 52. While described in detail later, the notifier 50 performs a date display and a day display and, also performs various notifications of schedules to the user.

The winding crown 21 and the button switches 22 to 25 each receive an operation from the user. The winding crown 21 can be pulled out from the case 10. Positions of the hour hand 32 and the minute hand 33 can be adjusted that the time can be set by pulling out the winding crown 21 and, while pulled out, rotating the winding crown 21. The button switches 22 to 25 are each operated when changing the function mode or the like.

Figure 2:
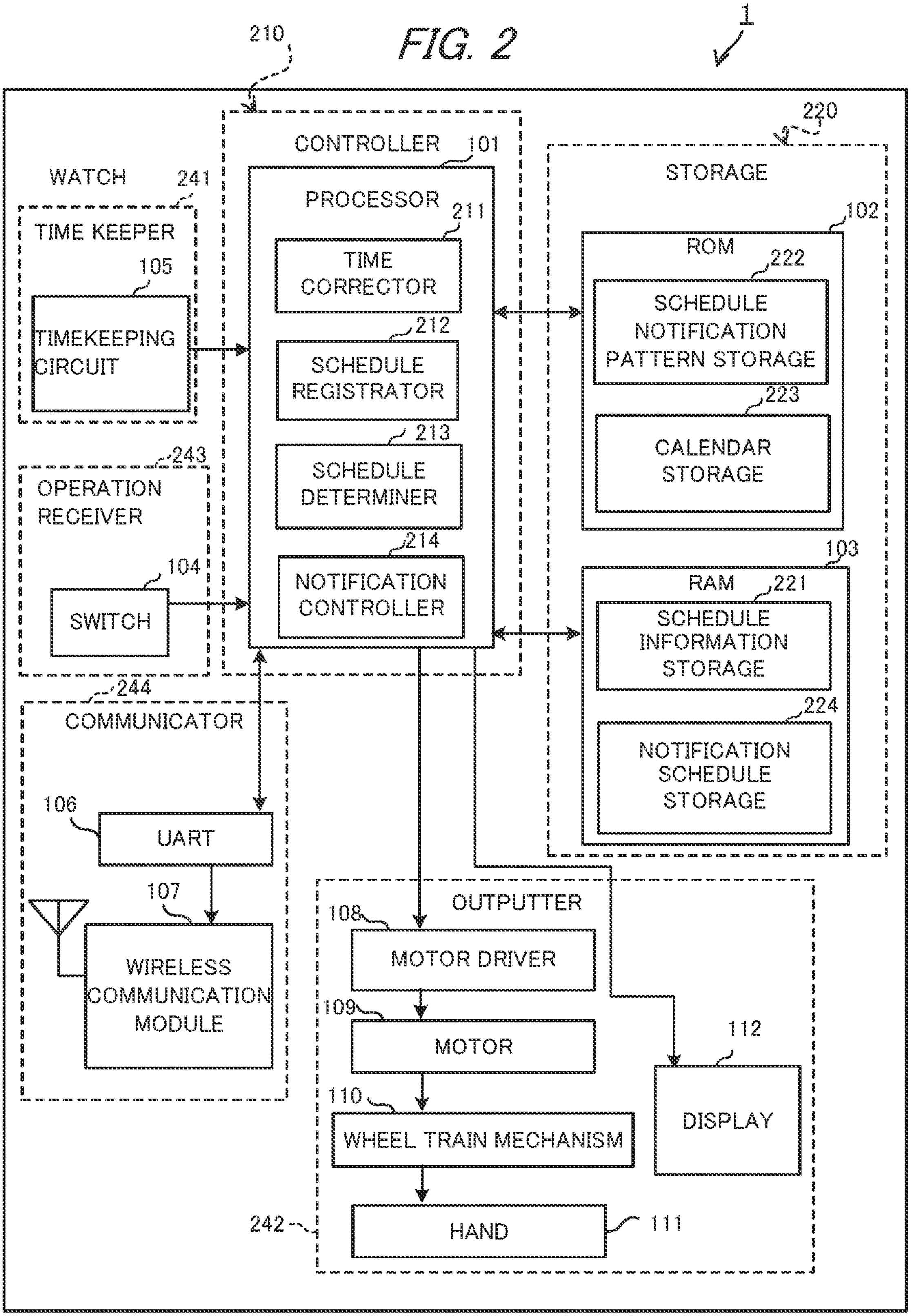
FIG. 2 is a block diagram illustrating the internal configuration of the watch according to an embodiment of the present disclosure.

Next, the hardware configuration of the watch 1 is described. As illustrated in FIG. 2, the watch 1 includes at least one processor 101, at least one read-only memory (ROM) 102 as a memory, a random access memory (RAM) 103, a switch 104, a timekeeping circuit 105, a universal asynchronous receiver transmitter (UART) 106, a wireless communication module 107, a motor driver 108, a motor 109, a wheel train mechanism 110, hands 111, and a display 112.

The processor 101 executes a variety of control programs to perform centralized control of the entire watch 1. The control programs and the like to be executed by the processor 101 and various types of data needed in advance to execute the control programs are stored in the ROM 102. Various types of data that is created or modified during the execution of the control programs is stored in the RAM 103. The RAM 103 functions as a workspace for the processor 101 to work.

The switch 104 receives input operations from the user and outputs, to the processor 101, electronic signals that correspond to the input operations. The switch 104 includes the winding crown 21 and the button switches 22 to 25 described above.

The timekeeping circuit 105 includes a crystal oscillator, a frequency dividing circuit, or the like, counts the current date and time by counting the number of signals acquired from the frequency dividing circuit, and outputs the counted results to the processor 101.

The UART 106 mutually converts parallel signals handled by the processor 101 and serial signals handled by the wireless communication module 107. The wireless communication module 107 includes a Bluetooth (registered trademark) Low Energy (BLE) module, an antenna, and the like, and performs data communication with a smartphone or similar external communication device. Schedule registration processing (described later) is performed via the wireless communication module 107 by receiving a schedule registration operation performed by the user.

The motor driver 108 outputs drive pulse signals to the motor 109 on the basis of commands from the processor 101. The motor 109 is constituted by a stepping motor, and drives the wheel train mechanism 110 in accordance with drive pulses input from the motor driver 108. Note that the motor 109 may be constituted by a motor other than a stepping motor.

The wheel train mechanism 110 is constituted by a combination of a plurality of gears. The wheel train mechanism 110 causes each of the hands 111 to rotate a predetermined angle at a time in accordance with the rotational movement of the motor 109. Note that, typically, pluralities of the motor 109, the wheel train mechanism 110, and the hands 111 are provided for each type of hand.

In one example, the hour hand 32 of the hands 111 is rotated one degree by a wheel train mechanism 110 for the hour hand each time the processor 101 drives the motor 109 for the hour hand one time every two minutes. Additionally, the minute hand 33 of the hands 111 is rotated 1/10 of a degree by the wheel train mechanism 110 for the minute hand each time the processor 101 drives the motor 109 for the minute hand one time every one second.

The display 112 is constituted by at least one display device such as a liquid crystal display device or an electroluminescence (EL) display device. The display 112 includes the number of seconds display area 34 and the notification area 51 described above. In one example, in the display 112, a number of seconds corresponding to the date and time counted by the timekeeping circuit 105 is displayed in the number of seconds display area 34; and a schedule notified by a notification controller 214 (described later), a date display, and a day display are displayed in the notification area 51.

Note that a description is given in which the watch 1 according to this embodiment is an analog watch in which the hands move mechanically. However, a configuration is possible in which the watch 1 is a watch in which the hands and the date and time are displayed on a display screen constituted by a liquid crystal, organic EL, or similar display device. For example, in a case of a watch having a liquid crystal screen, there is no need to provide the motor driver 108, the motor 109, the wheel train mechanism 110, and the hands 111, and it is sufficient that the processor 101 displays, on the display 112, the current date and time counted by the timekeeping circuit 105. In this case, it is sufficient that the display 112 includes the dial 31 and the various hands (the hour hand 32 and the minute hand 33).

Next, the functional configuration of the watch 1 is described. As illustrated in FIG. 2, the watch 1 includes a controller 210, a storage 220, a timekeeper 241, an outputter 242, an operation receiver 243, and a communicator 244.

The controller 210 includes the processor 101 that includes a central processing unit (CPU) or the like, and executes the programs stored in the storage 220 to realize the functions of the various components (a time corrector 211, a schedule registrator 212, a schedule determiner 213, and a notification controller 214) of the watch 1. The functions of the time corrector 211, the schedule registrator 212, the schedule determiner 213, and the notification controller 214 may be realized by a single processor or controller 210, or the various functions may be realized by providing a processor or a controller 210 to each individual component.

The controller 210 as the time corrector 211 executes time correction processing for correcting the time measured by the timekeeper 241. In this embodiment, the controller 210 receives the time of an external device (external time) as a result of schedule registration processing (described layer) being executed and communication with a smartphone or similar external device being carried out via the communicator 244. Moreover, the controller 210 corrects the time stored in the storage 220 to the external time on the basis of a difference between the time stored in the storage 220 and the external time received by the communicator 244. When a time correction operation from the user is received by the operation receiver 243, the controller 210 as the time corrector 211 corrects the time measured by the timekeeper 241 on the basis of the received time correction operation.

In schedule registration processing (described later), the controller 210 as the schedule registrator 212 receives, from a smartphone or similar external device via the communicator 244, schedule information to be notified. Additionally, the controller 210 stores the received schedule information in a schedule information storage 221 of the storage 220.

In notification processing (described later), the controller 210 as the schedule determiner 213 determines, for the schedule information stored in the schedule information storage 221, whether a schedule to be notified exists. For example, the controller 210 as the schedule determiner 213 determines whether a schedule for the current day exists, whether a schedule in the future of the current day exists, or the like.

In the notification processing (described later), the controller 210 as the notification controller 214 displays, on the display 112 in accordance with a determined notification pattern, the schedule stored as a notification schedule, thereby notifying the user that is the subject about the schedule (plan).

The storage 220 includes the ROM 102, the RAM 103, and the like. The ROM 102 includes a schedule notification pattern storage 222 that stores a notification pattern of the notification schedule, and a calendar storage 223 that stores information of a calendar including information about dates and days. Note that, to facilitate comprehension, the notification pattern and the calendar information in this embodiment are stored in advance. The RAM 103 includes a notification schedule storage 224 that stores information about schedules to be notified together with notification patterns. Note that, while not illustrated in the drawings, current date and time information as the count result inputted from the timekeeper 241 is stored in the RAM 103.

The timekeeper 241 includes the timekeeping circuit 105, counts the current date and time, and outputs the count results to the controller 210. The controller 210 performs, on the basis of the count results inputted from the timekeeper 241, timekeeping processing for updating the current date and time information in the RAM 103 of the storage 220. Note that the functions of the timekeeper 241 may be realized by the controller 210.

The outputter 242 includes a time display. The time display includes the motor driver 108, the motor 109, the wheel train mechanism 110, and the hands 111. The time display displays the current time. The outputter 242 includes the display 112. As described above, in the display 112, the counted number of seconds corresponding to the date and time is displayed in the number of seconds display area 34; and the schedule notified by the notification controller 214, a date display, and a day display are displayed in the notification area 51. Note that, in a case in which the watch 1 has a liquid crystal display, as described above, it is sufficient that the display 112 is configured so as to include the time display.

The operation receiver 243 is provided with the switch 104 that includes the winding crown 21 and the button switches 22 to 25. In this embodiment, the operation receiver 243 receives various input operations from the user. Examples of the input operations include a time correction operation for manually correcting the time measured by the timekeeper 241, and a schedule registration operation for starting schedule registration processing for storing the schedule information to be notified in the schedule information storage 221. Note that, as described later (see step S102 of FIG. 3), the time is corrected automatically in the schedule registration processing. As such, it can be said that the schedule registration operation includes a time correction operation for automatically correcting the time.

The communicator 244 includes the wireless communication module 107 and carries out data communication with a smartphone or similar external device. Examples of the content of the data communication include a send request and receipt of "information about the date and time" for the time correction, and a send request and receipt of "schedule information."

Figure 3:
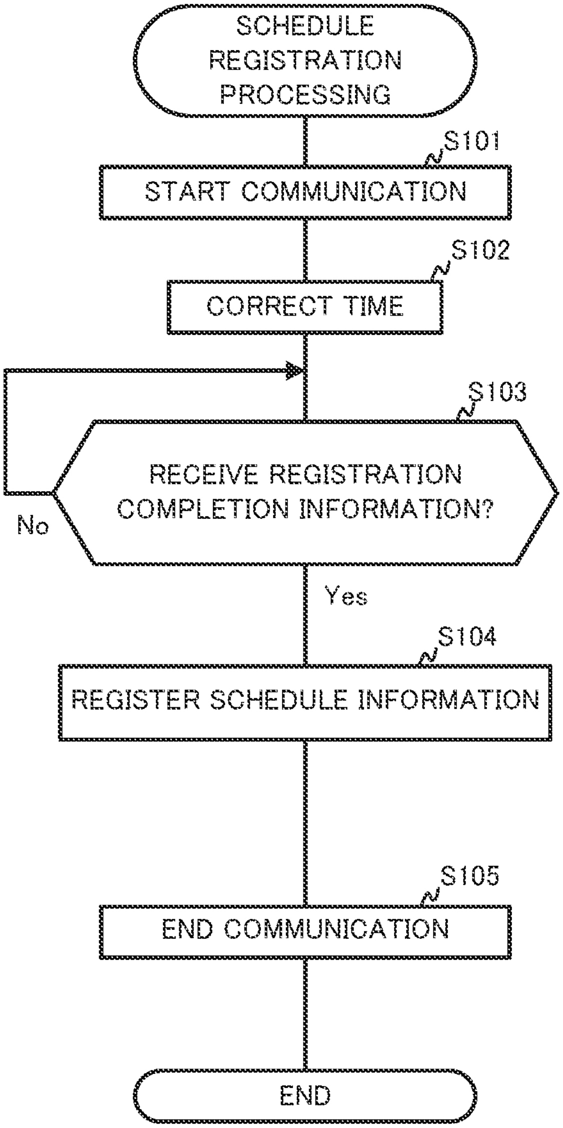
FIG. 3 is a flowchart illustrating an example of schedule registration processing.

Next, the schedule registration processing of the watch 1 according to this embodiment is described while referencing FIG. 3. The schedule registration processing is processing for storing (registering), in the schedule information storage 221, the schedule information to be notified. The schedule registration processing is started when the operation receiver 243 receives the schedule registration operation from the subject. Note that the user of the watch 1 operates a smartphone or similar external device to input the schedule information desired to be registered. The schedule registration processing is executed to register, in the schedule information storage 221, the schedule information to be notified. Additionally, while not illustrated in the drawings, in the schedule registration processing, it is possible to delete or modify schedule information that is already registered in the schedule information storage 221. In this case as well, it is sufficient that such deletion or modification is carried out on the basis of information input from a smartphone or similar external device owned by the user.

When the schedule registration processing is started, the controller 210 carries out, by the function of the schedule registrator 212, Bluetooth (registered trademark) or similar short-range wireless communication via the communicator 244, and starts communication with a nearby smartphone or similar external device (step S101).

Next, the controller 210 receives, by the function of the time corrector 211, the time information from the smartphone or similar external device, and carries out, in accordance with the difference between the received time (external time) and the time stored in the storage 220, time correction for correcting the time stored in the storage 220 to the external time (step S102). Note that, in this embodiment, an example is described in which the time correction is always performed in the processing of step S102 of the schedule registration processing. However, a configuration is possible in which the processing of step S102 is not carried out.

Thereafter, the controller 210 determines whether registration completion information indicating that the schedule registration is complete is received from the smartphone or similar external device (step S103), and if the registration completion information is not received (step S103; No), waits as-is until the registration completion information is received.

If the registration completion information is received (step S103; Yes), the schedule information received together with the registration completion information is registered (stored) in the schedule information storage 221 of the storage 220 (step S104).

FIG. 4 is an explanatory drawing illustrating an example of the schedule information registered in the schedule information storage 221 in the processing of step S104. As illustrated in FIG. 4, in this embodiment, five pieces of schedule information, namely "No. 1" to "No. 5", for example, can be registered. As such, in the processing of step S103 of FIG. 3, when a plurality of schedule information is received together with the registration completion information, that plurality of schedule information is registered collectively in the processing of step S104. Note that, configurations are possible in which pluralities of schedule information consisting of more or less than five pieces of schedule information can be registered.

As illustrated in FIG. 4, the schedule information includes information such as "schedule setting date and the like" expressing a setting period of the schedule such as an execution date, an execution period, or an execution day of the schedule; a "repeat setting" expressing whether to repeatedly execute the schedule every week, every month, or every year, that is, a setting for whether to set as a repeating notification target; and "notification content" expressing content to be notified.

Specifically, the schedule information of "No. 1" in FIG. 4 is "Aug. 24, 2020" and "No repeat" and, as such, this schedule information expresses that a notification of the notification content "TEST" will be carried out on Aug. 24, 2020. The schedule information of "No. 2" is "May 23" and "Every year" and, as such, this schedule information expresses that a notification of the notification content "BIRTHDAY" will be carried out on May 23 every year. The schedule information of "No. 3" is "May 23, 2020 to May 25, 2020" and "No repeat" and, as such, this schedule information expresses that a notification of the notification content "TRIP" will be carried out from May 23, 2020 to May 25, 2020. The schedule information of "No. 4" is "July 23 to August 31" and "Every year" and, as such, this schedule information expresses that a notification of the notification content "VACATION" will be carried out from July 23 to August 31 every year. The schedule information of "No. 5" is "Thursday" and "Every week" and, as such, this schedule information expresses that a notification of the notification content "LESSON" will be carried out every week on Thursday.

Returning to FIG. 3, after the processing of step S104 is executed, the controller 210 ends the Bluetooth (registered trademark) or similar short-range wireless communication, ends the communication with the nearby smartphone or similar external device (step S105), and ends the schedule registration processing. Due to the schedule registration processing being executed in this manner, the schedule information inputted into the smartphone or similar external device is registered in the schedule information storage 221 as the schedule information to be notified.

FIG. 5 is an explanatory drawing illustrating examples of notification patterns stored in the schedule notification pattern storage 222 of the storage 220. As illustrated in FIG. 5, a notification pattern 1 is a notification mode in which the notification content of the schedule information to be notified registered in the schedule information storage 221 is scroll displayed at a normal speed. A notification pattern 2 is a notification mode in which the notification content of the schedule information to be notified registered in the schedule information storage 221 is scroll displayed at the normal speed and, then, is scroll displayed at a speed at which the scroll display is repeated every one second. Note that, the normal speed in this embodiment is 0.7 seconds, for example, and is faster than the speed of the repeating scroll display in the notification pattern 2. As such, due to the scroll display being repeated every one second in the notification pattern 2, the user can reliably confirm the content of the notification schedule. Note that the user can carry out setting changes for the speed of the scroll display in the notification pattern 1 and the notification pattern 2. Moreover, more notification patterns, such as a notification pattern 3 and a notification pattern 4 can be set. Additionally, while not illustrated in the drawings, when performing the scroll display using the notification pattern 1 or the notification pattern 2, a title display is performed and, then the scroll display is carried out. Note that other displays (for example, display of the day and/or date as in FIG. 1) may be performed before and/or after the title display.

Figure 6:
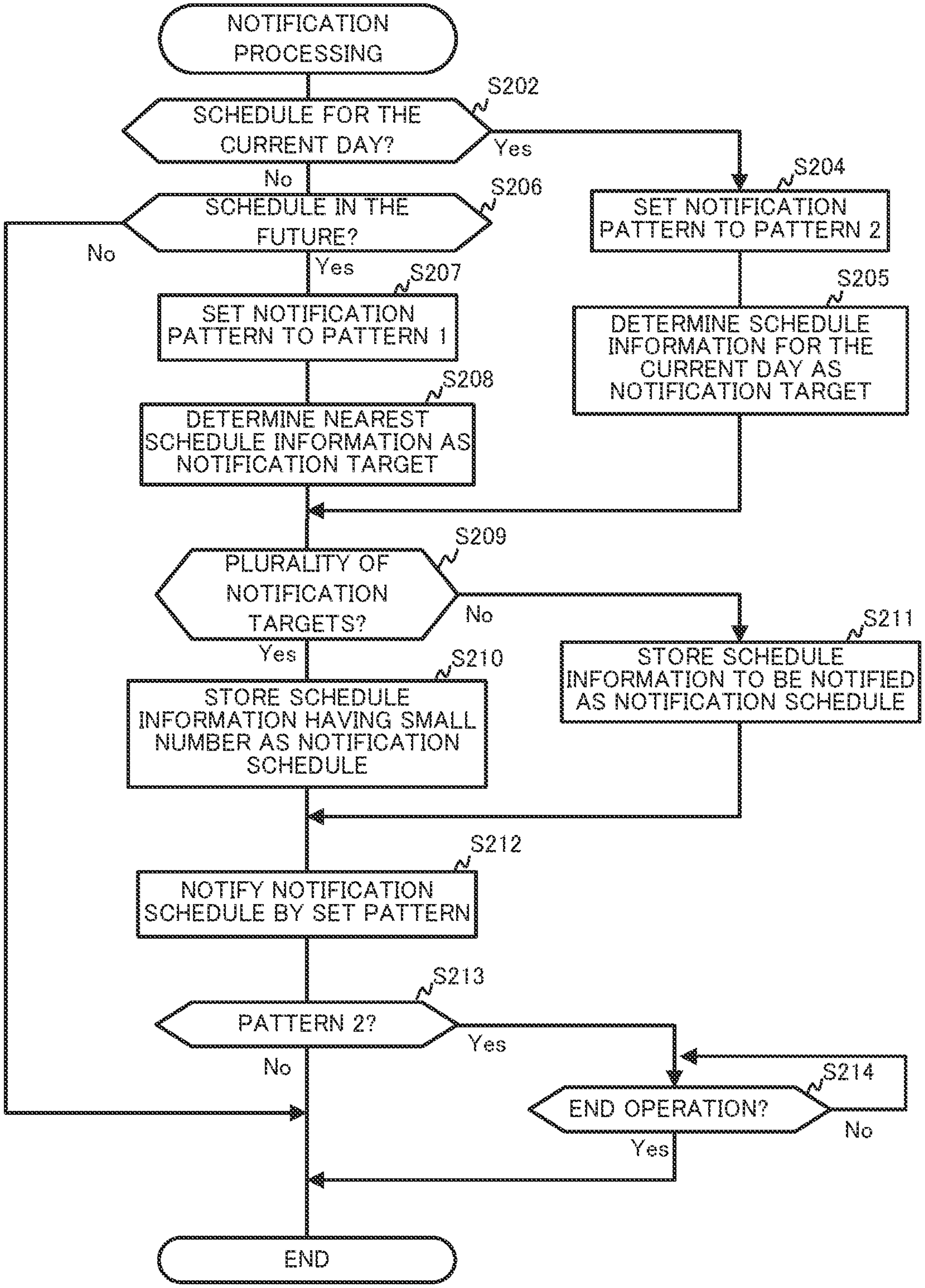
FIG. 6 is a flowchart illustrating an example of notification processing.

Next, the notification processing of the watch 1 according to this embodiment is described while referencing FIG. 6. The notification processing is processing for notifying the notification content of the schedule information registered in the schedule information storage 221 as the notification target. The notification processing is started when the operation receiver 243 receives an input operation (notification operation) performed by the subject. In the following, to facilitate comprehension, examples are described in which the schedule information of FIG. 4 is registered in the schedule information storage 221, and the current date and day is Friday, May 22, 2020 (example 1), or Saturday, May 23, 2020 (example 2). Instead of or in addition to the current date and day, time may be set. Note that, in the notification processing of this embodiment, the notification mode differs for when the registered schedule information is a schedule in the future and when the registered schedule information is a schedule for the current day.

Firstly, example 1 is described. When the notification processing starts, the controller 210 determines, by the function of the schedule determiner 213, whether schedule information for the current day exists in the schedule information stored in the schedule information storage 221 (step S202). In example 1, the current date and day is Friday, May 22, 2020, and schedule information corresponding to Friday, May 22, 2020 does not exist (see FIG. 4). As such, in step S202, the controller 210 determines that a schedule for the current day does not exist (step S202; No). Note that, in this embodiment, an example is given in which the processing of step S202 and the processing of step S206 (described later) are executed in the notification processing. However, the determinations of the processing of step S202 and the processing of step S206 (described later) may, for example, be made at a timing at which the date changes, a timing at which a date and time setting operation is performed, a timing at which a connection to a smartphone or the like is made, or the like. In such a case, in the processing of step S202 and the processing of step S206 (described later), it is sufficient that processing is performed for confirming the determination results of the determinations made at these timings. Note that a configuration is possible in which, each time the notification processing is performed, the current date and day are acquired and compared with the schedule information stored in the schedule information storage 221 to perform the processing of step S202 and the processing of step S206 (described later).

Thereafter, the controller 210 determines, by the function of the schedule determiner 213, whether schedule information for the future exists in the schedule information stored in the schedule information storage 221 (step S206). In example 1, since the current date and day is Friday, May 22, 2020, the controller 210 determines that all of the schedule information of "No. 1" to "No. 5" of FIG. 4 is schedule information for the future (step S206; Yes). Note that, if the controller 210 determines in the processing of step S206 that no schedule information for the future exists (step S206; No), the controller 210 determines that no schedule information to be notified exists and ends the notification processing.

After a determination of Yes is made in step S206, the controller 210 determines the pattern 1 as the notification pattern (step S207), and determines the nearest schedule information as the notification target (step S208). Specifically, in the processing of step S208, the schedule information nearest to the current date and day is determined as the notification target. In example 1, the pattern 1 of FIG. 5 is determined as the notification pattern in the processing of step S207, and the schedule information of "No. 2" and "No. 3" are determined, in the processing of step S208, as the nearest schedule information and as the notification target. Note that, in this example, two pieces of schedule information, namely "No. 2" and "No. 3", exist as the nearest schedule information. As such, a plurality of schedule information is determined as the notification target. However, if only one piece of schedule information exists, it is sufficient that one piece of schedule information is determined as the notification target.

After the processing of step S208 is executed, the controller 210 determines whether a plurality of schedule information determined as the notification target exists (step S209). In example 1, two pieces of schedule information, namely "No. 2" and No. 3" are determined as the notification target. As such, the controller 210 determines, in the processing of step S209, that a plurality of schedule information determined as the notification target exists (step S209; Yes).

Next, the controller 210 stores, by the function of the notification controller 214 and in the notification schedule storage 224, the schedule information having the smaller number as a schedule to be notified (step S210). Note that, if the controller 210 determines, in step S209, that a plurality of schedule information determined as the notification target does not exist (step S209; No), the schedule information determined, in step S209, as the notification target is stored without modification in the notification schedule storage 224 as the schedule to be notified (step S211). In example 1, the schedule information of "No. 2" that has the smaller number of the two pieces of schedule information "No. 2" and "No. 3" is stored in the notification schedule storage 224 as the schedule to be notified.

Figure 7A:
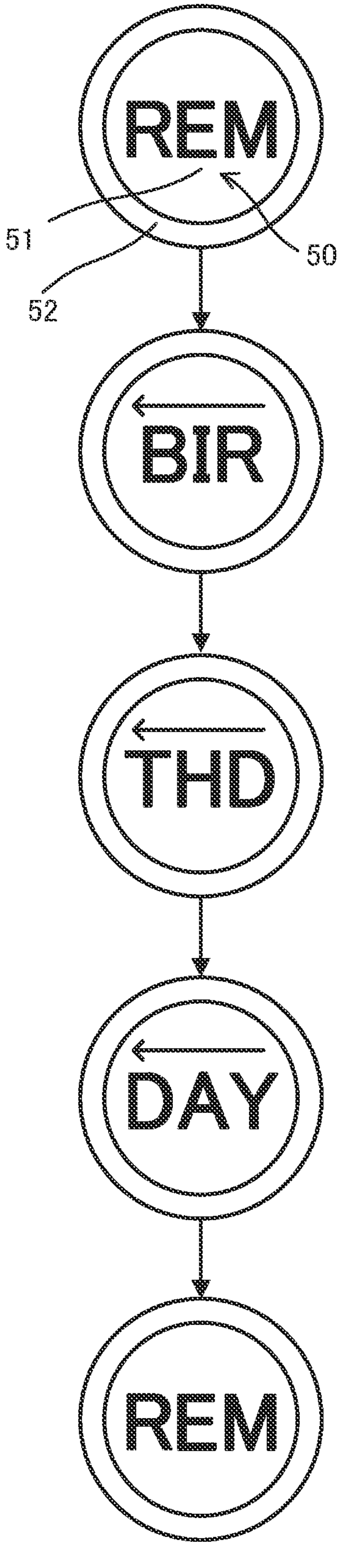
FIG. 7A is a drawing illustrating an example of a notification mode of a notification pattern of a pattern 1.
Figure 7B:
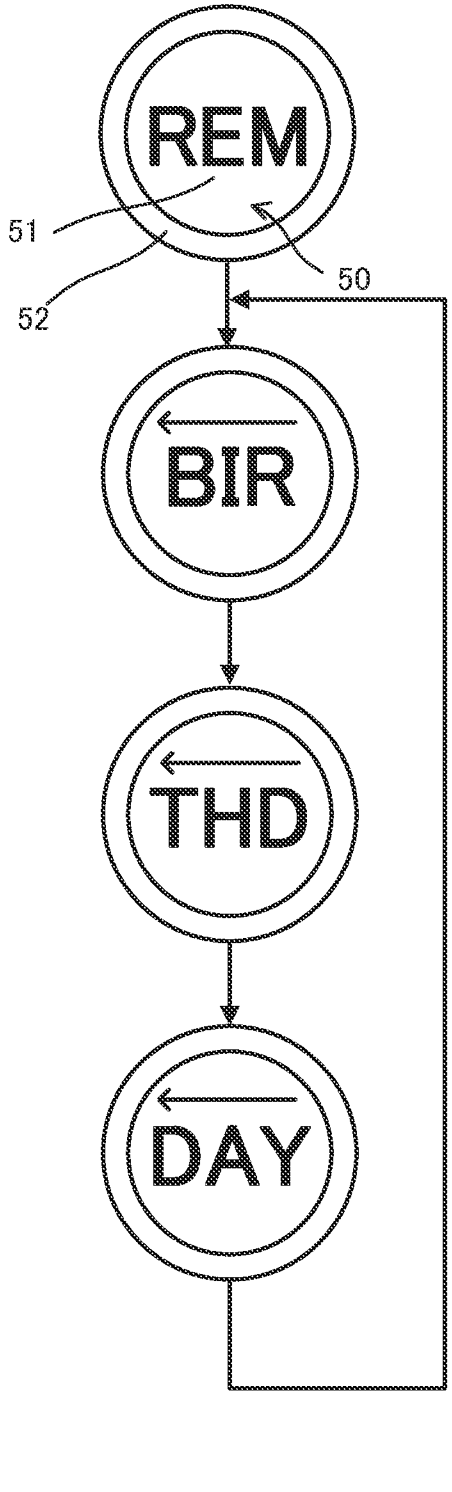
FIG. 7B is a drawing illustrating an example of a notification mode of a notification pattern of a pattern 2.

After the processing of step S210 or step S211 is executed, the controller 210 notifies, by the function of the notification controller 214, the schedule by displaying, on the display 112, the schedule to be notified that is stored in the notification schedule storage 224 (step S212). Here, the displaying is carried out in the notification mode of the notification pattern set in step S204 or step S207. Next, the controller 210 determines whether the notified pattern is pattern 2 (step S213) and, if the notified pattern is pattern 1 (step S213; No), the notification processing is ended. In example 1, as illustrated in FIG. 7A, as a result of the processing of step S212, "BIRTHDAY" is displayed only one time in the notification mode of pattern 1 as the notification content of the schedule information of "No. 2", a determination of No is made in the processing of step S213, the notification is ended, and "REM", which is a display of a title indicating that the display is a reminder display, is fixed and displayed. Note that, as with the display of "REM" illustrated in FIG. 7A, the display of "REM" illustrated in FIG. 7B is also a display of a title indicating that the display is a reminder display. The arrows shown in FIG. 7 are shown for convenience to indicate the movement of characters, and are not displayed on the actual display screen.

A description of notification processing in the case of example 1 is given above. Next, notification processing in the case of example 2 is described. Note that descriptions of portions that are the same as in example 1 are forgone.

In the case of example 2, the current day is Saturday, May 23, 2020. As such, in the processing of step S202, a determination is made that a schedule for the current day exists (the schedule information of "No. 2" and "No. 3" of FIG. 4). When the determination is made that schedule information for the current day exists in step S202 (step S202; Yes), the controller 210 sets the pattern 2 as the notification pattern (step S204), and determines the schedule information for the current day as the notification target (step S205). In example 2, the pattern 2 of FIG. 5 is determined as the notification pattern in the processing of step S204, and the schedule information of "No. 2" and "No. 3" are determined, in the processing of step S205, as the schedule information for the current day and as the notification target. In this embodiment, in addition to the schedule information for the current day of "No. 2", schedule information of a certain period that includes the current day, such as "No. 3", is determined as the notification target. Note that, in this example, two pieces of schedule information, namely "No. 2" and "No. 3", exist as the schedule information for the current day. As such, a plurality of schedule information is determined as the notification target. However, if only one piece of schedule information exists, it is sufficient that one piece of schedule information is determined as the notification target.

Thereafter, when the processing of step S212 is executed after the processing of step S209 and step S210 is executed, in the case of example 2 and as illustrated in FIG. 7B, "BIRTHDAY" is scroll displayed in the notification mode of the pattern 2 as the notification content of the schedule information of "No. 2." Note that, in a case in which "TRIP", as the notification content of the schedule information of the certain period of "No. 3", is to be notified during that certain period, "TRIP" is scroll displayed in the notification mode of pattern 2. Then, a determination of Yes is made in the processing of step S213 of FIG. 6 (step S213; Yes), and a determination is made as to whether the operation receiver 243 receives an end operation (step S214). If the end operation, which is an operation for ending the notification, is received (step S214; Yes), the notification processing is ended, and the notification ends. Meanwhile, if the end operation is not received (step S214; No), the scroll displaying is repeated every one second as illustrated in FIG. 7B. The scroll displaying is repeated until the end operation is received and, as such, compared to the notification mode of the pattern 1 illustrated in FIG. 7A, the notification mode of the pattern 2 illustrated in FIG. 7B consumes more power. However, the repeating makes it possible to prevent the schedule for the current day from being missed. Note that, in the example illustrated in FIG. 7B, a scroll display of "BIRTHDAY" is performed once at the normal speed and, then, "BIRTHDAY" is repeatedly scroll displayed every one second. The scroll speed of the second and following scroll displaying of "BIRTHDAY" is slower than the scroll speed of the first scroll displaying of "BIRTHDAY."

Thus, in the watch 1 according to this embodiment, for the various schedules of the user, a schedule for the current day (or a certain period that includes the current day) and a schedule in the future of the current day (or a certain future period that does not include the current day) can be notified in different modes. Accordingly, the schedule of the user can be effectively notified.

Additionally, a notification of a schedule in the future (certain future period) is scroll displayed only one time, and a notification of a schedule for the current day (certain period) is scroll displayed at the normal speed and, then, repeatedly scroll displayed every one second at a comparatively slower speed. As such, the notification of the schedule for the current day (certain period) is emphasized more than the notification of the schedule in the future (certain future period). Therefore, it is possible to prevent the schedule for the current day (certain period) from being missed. Furthermore, the notification of the schedule for the current day (certain period) differs from the notification of the schedule in the future (certain future period) and the notification of the schedule for the current day is repeatedly scroll displayed until the user performs the end operation, which also makes it possible to prevent the schedule for the current day (certain period) from being missed. Additionally, the scroll display is not repeated for the schedule in the future (certain future period) and, as such, the notification mode of the schedule in the future (certain future period) consumes less power than the notification mode of schedule for the current day (certain period).

Note that the present disclosure is not limited to the embodiment described above, and various modifications of portions are possible without departing from the spirit and scope of the present disclosure.

Modified Example 1

Figure 8A:
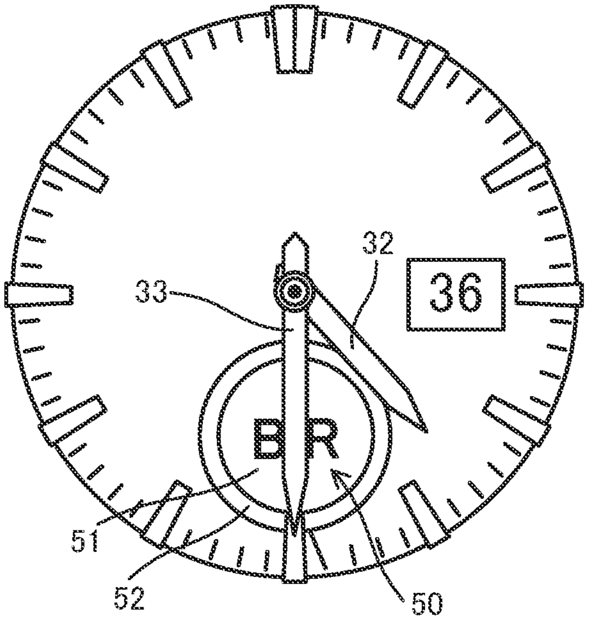
FIG. 8A is an appearance drawing of a dial and the like in a modified example, and is an explanatory drawing of a case in which a hand overlaps a notifier.

In the embodiment described above, an example is described in which the schedule to be notified is scroll displayed in the notification area 51 of the display 112. However, as illustrated in FIG. 8A, there are cases in which, depending on the time, the hands (the hour hand 32 and the minute hand 33) overlap the notification area 51 (the minute hand 33 in the example illustrated in FIG. 8A), and the visibility of the scroll displaying is obstructed. As such, a configuration is possible in which, before executing the processing of step S212 in the notification processing of FIG. 6, a determination is made as to whether a hand is overlapping the notification area 51 and, if overlapping is determined, processing is executed for setting that hand to a non-overlapping state. According to this configuration, decreases of the visibility of the notification of the schedule can be prevented, and suitable notification can be carried out. Note that this is the same in cases in which a second hand is provided.

Figure 10:
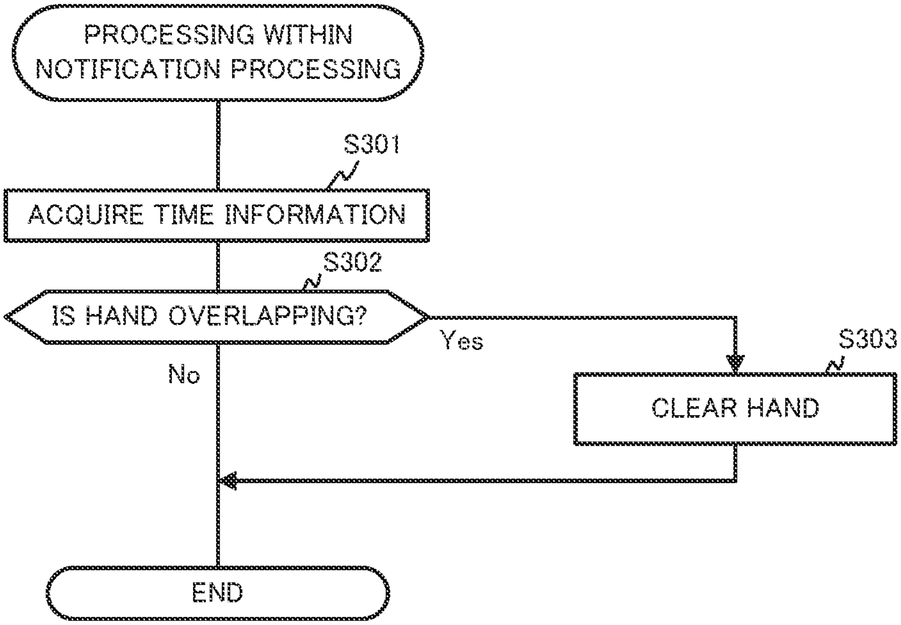
FIG. 10 is a flowchart illustrating an example of processing within the notification processing in a modified example.

FIG. 10 is a flowchart illustrating an example of processing, within the notification processing, that is performed before executing the processing of step S212 in the notification processing of FIG. 6. In the processing, within the notification processing, illustrated in FIG. 10, the controller 210 acquires the time information stored in the storage 220 (step S301). Then, the controller 210 determines whether a hand is overlapping the notification area 51 (step S302).

For the determination of whether a hand is overlapping the notification area 51, it is sufficient to determine whether the time acquired in step S301 is a time of a predetermined condition. Examples thereof include whether the time acquired in step S301 is from 5:00 to 7:00 or is from 25 minutes to 35 minutes on the hour. Here, the hour hand 32 overlaps when the time is from 5:00 to 7:00, and the minute hand overlaps when the time is from 25 minutes to the 35 minutes on the hour. Separately, whether or not a hand is overlapping may be determined by a sensor.

Figure 8B:
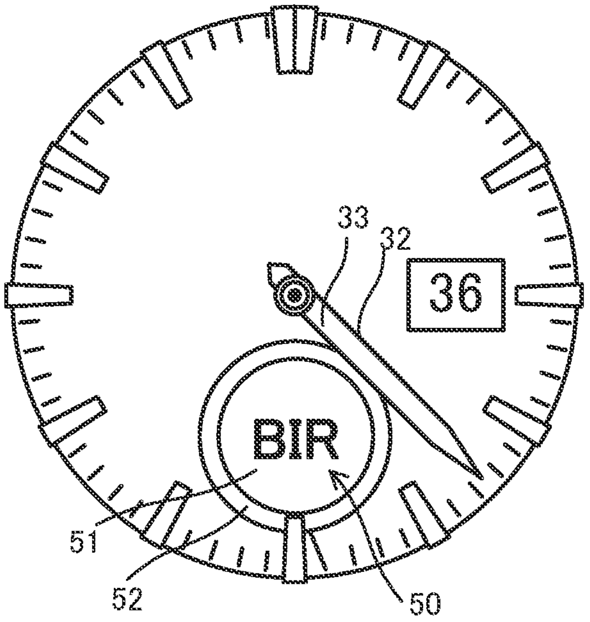
FIG. 8B is an appearance drawing of a dial and the like in a modified example, and is an explanatory drawing illustrating an example of a case in which the hand is moved to a retreat position.

If a determination is made in the processing of step S302 that a hand is overlapping (step S302; Yes), as the non-overlapping state, the minute hand 33 is cleared, in a direction in which the movement distance is shorter, to a position that overlaps the hour hand 32 such as illustrated in FIG. 8B, for example (step S303), and the processing within the notification processing is ended. Note that, when the time is 6:30, for example, the minute hand 33 and the hour hand 32 may be cleared simultaneously to the 8:40 position. The cleared position is not limited to positions where the minute hand 33 and the hour hand 32 overlap, and may be any predetermined position. For example, the cleared position may be set so as to reduce the movement distance. For example, the hands may be cleared to the three o'clock position when from 25 minutes to 30 minutes on the hour, and may be cleared to the nine o'clock position when from 30 minutes to 35 minutes on the hour. Furthermore, while not illustrated in the drawings, a configuration is possible in which, in a case in which the minute hand 33 and/or the hour hand 32 is cleared in the processing of step S303, a clearing display that enables the subject to recognize that the minute hand 33 and/or the hour hand 32 is cleared may be performed in the notification area 51. According to this configuration, misrecognition of the current time can be prevented.

Meanwhile, if a determination is made in the processing of step S302 that a hand is not overlapping (step S302; No), the processing within the notification processing is ended.

Figure 8C:
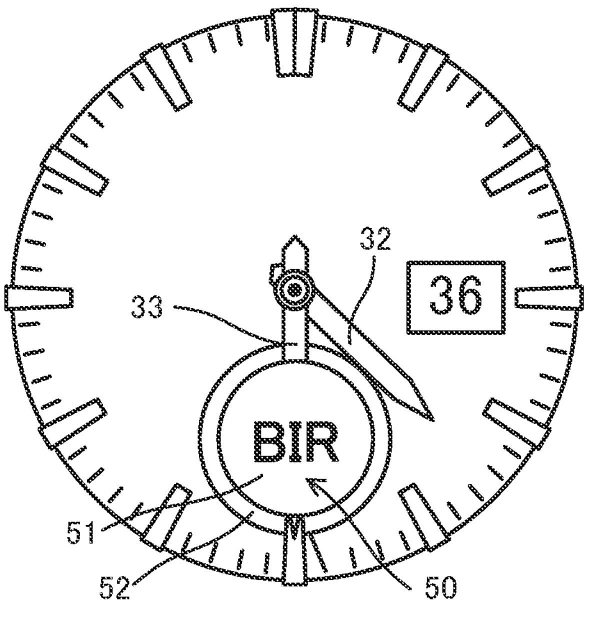
FIG. 8C is an appearance drawing of a dial and the like in a modified example, and is an explanatory drawing illustrating a case in which a display layer of a notification area is changed.

Additionally, a configuration is possible in which, when the watch 1 is a watch that has a liquid crystal display, that is, when the watch 1 is a watch that displays the hands and/or the date and time on a display screen constituted by a liquid crystal, an organic EL, or similar display device, as the non-overlapping state, as illustrated in FIG. 8C, the display layer of the hand determined to be overlapping (the minute hand 33 in the illustrated example) is changed so as to be behind the display layer of the notification area 51 (but in front of the notification frame 52).

In the embodiment described above, an example is described in which the notifier 50 is provided in the six o'clock direction of the dial 31. However, the notifier 50 may be provided at any position. For example, the notifier 50 may be provided in the three o'clock direction. In this case as well, when a hand overlaps the notification area 51, it is sufficient that processing is executed for setting that hand to the non-overlapping state.

Modified Example 2

Figure 9A:
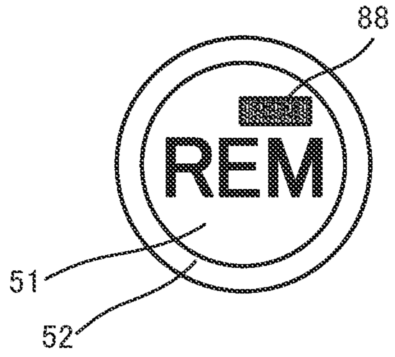
FIG. 9A is an explanatory drawing illustrating an example of a pre-notification display in a modified example, and illustrates an example of a lighting mode of a pre-notification display in a case in which a schedule is not registered.
Figure 9B:
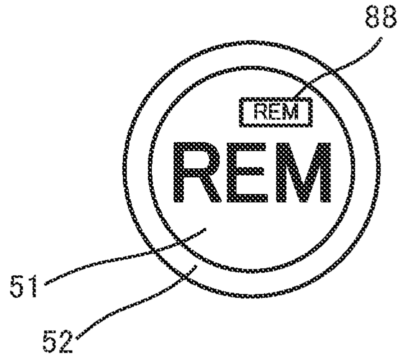
FIG. 9B is an explanatory drawing illustrating an example of a pre-notification display in a modified example, and illustrates an example of a lighting mode of a pre-notification display in a case in which a schedule in the future is registered.
Figure 9C:
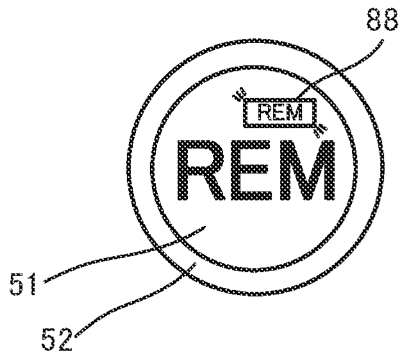
FIG. 9C is an explanatory drawing illustrating an example of a pre-notification display in a modified example, and illustrates an example of a lighting mode of a pre-notification display in a case in which a schedule for the current day is registered.

In the embodiment described above, an example is described in which the notification schedule is notified by executing the notification processing. However, a configuration is possible in which a pre-notification display 88 illustrated in FIGS. 9A to 9C is performed at the timing at which a notification operation is performed, and whether a notification schedule exists, and if the notification schedule is a schedule for the future (certain future period) or is a schedule for the current day (certain period) is indicated by a lighting mode of the pre-notification display 88. Specifically, FIG. 9A illustrates an example of the lighting mode of the pre-notification display 88 in a case in which a notification schedule is not registered. As illustrated in FIG. 9A, when a notification schedule does not exist, the pre-notification display 88 remains turned OFF. Due to this configuration, the user can recognize that a notification schedule does not exist.

FIG. 9B illustrates an example of the lighting mode of the pre-notification display 88 in a case in which a schedule in the future is registered as a notification schedule. As illustrated in FIG. 9B, when a schedule in the future (certain future period) is registered, the pre-notification display 88 turns ON. Due to this configuration, the user can recognize that a schedule in the future is registered as a notification schedule. FIG. 9C illustrates an example of the lighting mode of the pre-notification display 88 in a case in which a schedule for the current day (certain period) is registered as a notification schedule. As illustrated in FIG. 9C, when a schedule for the current day (certain period) is registered, the pre-notification display 88 flashes. Due to this configuration, the user can recognize that a schedule for the current day (certain period) is registered as a notification schedule. The pre-notification display 88 makes it possible to recognize whether a notification schedule exists, and if that notification schedule is a schedule in the future (certain future period) or a schedule for the current day (certain period) and, as such, notifications of schedules can be performed in a suitable manner.

Note that the user can perform settings to change each of the lighting modes as desired. Additionally, a configuration is possible in which, in addition the lighting mode being varied on the basis of whether a notification schedule exists and if that notification schedule is a schedule in the future (certain future period) or a schedule for the current day (certain period), the flashing mode is varied on the basis of the notification content. For example, in a case in which the notification schedule is a schedule for the current day (certain period), the pre-notification display 88 flashes every three seconds if the notification content is "BIRTHDAY", every two seconds if the notification content is "LESSON", and the like. Additionally, a configuration is possible in which the notification content is divided into a number of groups, and the flashing mode is varied by group. Due to this configuration, in addition to the registration of a schedule for the current day (certain period), the notification content is indicated and, as such, the user can ascertain the schedule for the current day (certain period) at an early stage.

Modified Example 3

In the embodiment described above, an example is described in which the schedule in the future (certain future period) is notified in the notification mode of the notification pattern 1, and the schedule for the current day (certain period) is notified in the notification mode of the notification pattern 2. However, a configuration is possible in which the notification mode of the notification pattern 2 is an emphasized mode that is more easily recognizable than the notification mode of the notification pattern 1. For example, the notification mode of the notification pattern 2 may further include flashing of the scroll display, outputting of sound, or the like. Additionally, a configuration is possible in which, instead of scroll displaying, only sound is output. In such a case, for the notification mode of the notification pattern 2, it is sufficient that the sound is repeatedly output, the output volume is increased so as to be greater than in the notification mode of the notification pattern 1, and the like. That is, it is sufficient that the notification mode of the notification pattern 1 consumes less power than the notification mode of the notification pattern 2. Additionally, an example is described in which, in the notification pattern 2, after performing a notification that is the same as the notification pattern 1 (scroll display at normal speed), repeating notification is performed every one second. However, a configuration is possible in which, for the notification mode of the notification pattern 2, a notification that is the same as the notification pattern 1 is not performed. Furthermore, a configuration is possible in which, for the notification pattern for the schedule for the current day (certain period), five notification patterns, namely notification pattern 1 to notification pattern 5, are prepared, and the user can select one of the notification patterns according to the notification content. In addition, a configuration is possible in which the user can set the notification patterns and the notification modes of the notification patterns. For example, a configuration is possible in which set notification patterns can be received from a smartphone or the like. Due to this configuration, notifications can be performed in notification modes that match the preferences of the user, and notifications can be performed in a more suitable manner.

Modified Example 4

In the embodiment described above, an example is described in which, in the processing of step S208 of FIG. 6, when a plurality of schedules in the future (certain future period) is registered, the nearest schedule, that is, the schedule information nearest to the current date and day is set as the notification target. However, this is only an example. Even in cases in which a plurality of schedules in the future (certain future period) is registered, as in the processing of step S210, it is possible to set the schedule information that has the smallest number as the notification target. Additionally, a configuration is possible in which the user can set, in advance, which schedule information to prioritize. In such a case, it is sufficient that processing for setting priority is executed after the schedule information is registered in the schedule registration processing of FIG. 3. Note that the priority may be set by communication with a smartphone or similar external communication device, or may be set by an input operation of the user on the watch 1. In the processing of step S208 of FIG. 6, it is sufficient that the schedule information that has the highest priority is determined as the notification target. Due to this configuration, for a plurality of schedules in the future that exists, notifications of the schedules are performed according to the settings of the user and, as such, notifications can be performed in a more suitable manner.

Modified Example 5

In the embodiment described above, an example is described in which the notification content is scroll displayed from right to left as illustrated in FIGS. 7A and 7B. However, this is only an example. A configuration is possible in which, for example, in the case of the notification pattern 1, the notification content is scroll displayed from right to left, and in the case of the notification pattern 2, the notification content is scroll displayed at the normal speed and, then, is repeatedly scroll displayed from left to right. Due to this configuration, scroll displaying that is not performed in the notification pattern 1 is performed and, as such, the notification mode when notifying of a schedule for the current day (certain period) can be more emphasized, and suitable notifications can be performed. Additionally, a configuration is possible in which, after the scroll displaying at the normal speed is ended, a plurality of scroll patterns is repeated in the order of scroll displaying from left to right, scroll displaying from up to down, scroll displaying from down to up, and scroll displaying from right to left. Furthermore, a configuration is possible in which the user can set the scroll direction in accordance with the notification content. Here, the scroll direction may be set by communication with a smartphone or similar external communication device, or may be set by an input operation of the user on the watch 1. Due to this configuration, it is possible to set the scroll direction in accordance with the notification content and, as such, notifications that better match the preferences of the user can be performed.

Modified Example 6

In addition, a configuration is possible in which the watch 1 is provided with various functions in addition to the functions described in the aforementioned embodiment. Examples of these various functions include a function of a stopwatch, a small clock that displays the time of another country, and the like.

Modified Example 7

Note that the present disclosure is not limited to a watch, and the notification control device of the present disclosure includes other devices that are provided with the schedule registrator 212, the schedule determiner 213, and the notification controller 214 described above.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A notification control device comprising:
at least one processor configured to:
acquire a plan of a subject; and
cause a notifier, the notifier comprising at least one display provided together with a hand that displays time on a face of a watch, to notify current day plan content information in a first notification mode and future plan content information in a second notification mode that differs from the first notification mode,
wherein the current day plan content information is information about the acquired plan of the subject for a current day or information about the acquired plan of the subject for a certain period including the current day,
wherein the future plan content information is information about the acquired plan of the subject for a future of the current day or information about the acquired plan of the subject for a certain future period not including the current day, and
wherein the at least one processor is configured to set the hand to a non-overlapping state if the hand overlaps the at least one display in a case in which the current day plan content information is displayed, on the at least one display, in a first display mode as the first notification mode, and in a case in which the future plan content information is displayed, on the at least one display, in a second display mode as the second notification mode.

2. The notification control device according to claim 1, wherein the first notification mode is a notification mode that is more emphasized than a notification in the second notification mode.

3. The notification control device according to claim 1, wherein the second notification mode is a notification mode that consumes less electrical energy than the first notification mode.

4. The notification control device according to claim 1, wherein the at least one processor is configured to determine whether the hand overlaps the at least one display.

5. A watch comprising:
a timing circuit configured to clock a current time;
a watch face;
a notifier comprising at least one display provided together with a hand that displays time on the watch face; and
at least one processor configured to;
acquire a plan of a subject; and
cause the notifier to notify current day plan content information in a first notification mode and future plan content information in a second notification mode that differs from the first notification mode,
wherein the current day plan content information is information about the acquired plan of the subject for a current day or information about the acquired plan of the subject for a certain period including the current day,
wherein the future plan content information is information about the acquired plan of the subject for a future of the current day or information about the acquired plan of the subject for a certain future period not including the current day, and
wherein the at least one processor is configured to set the hand to a non-overlapping state if the hand overlaps the at least one display in a case in which the current day plan content information is displayed, on the at least one display, in a first display mode as the first notification mode, and in a case in which the future plan content information is displayed, on the at least one display, in a second display mode as the second notification mode.

6. A notification control method executed by at least one processor, the notification control method comprising:
acquiring a plan of a subject; and
causing a notifier, the notifier comprising at least one display provided together with a hand that displays time on a face of a watch, to notify current day plan content information in a first notification mode and future plan content information in a second notification mode that differs from the first notification mode,
wherein the current day plan content information is information about the acquired plan of the subject for a current day or is information about the acquired plan of the subject for a certain period including the current day,
wherein the future plan content information is information about the acquired plan of the subject for a future of the current day or information about the acquired plan of the subject for a certain future period not including the current day, and
wherein causing the notifier to notify the current day plan content information and the future plan content information comprises setting the hand to a non-overlapping state if the hand overlaps the at least one display in a case in which the current day plan content information is displayed, on the at least one display, in a first display mode as the first notification mode, and in a case in which the future plan content information is displayed, on the at least one display, in a second display mode as the second notification mode.

7. A non-transitory recording medium storing a program that causes a computer to:
acquire a plan of a subject; and
cause a notifier, the notifier comprising at least one display provided together with a hand that displays time on a face of a watch, to notify current day plan content information in a first notification mode and future plan content information in a second notification mode that differs from the first notification mode,
wherein the current day plan content information is information about the acquired plan of the subject for a current day or information about the acquired plan of the subject for a certain period including the current day,
wherein the future plan content information is information about the acquired plan of the subject for a future of the current day or information about the acquired plan of the subject for a certain future period not including the current day, and
wherein in causing the notifier to notify the current day plan content information and the future plan content information, the program causes the computer to set the hand to a non-overlapping state if the hand overlaps the at least one display in a case in which the current day plan content information is displayed, on the at least one display, in a first display mode as the first notification mode, and in a case in which the future plan content information is displayed, on the at least one display, in a second display mode as the second notification mode.

* * * * *